(12) United States Patent
Hanhan

(10) Patent No.: US 6,711,611 B2
(45) Date of Patent: *Mar. 23, 2004

(54) METHOD AND APPARATUS FOR DATA-LINKING A MOBILE KNOWLEDGE WORKER TO HOME COMMUNICATION-CENTER INFRASTRUCTURE

(75) Inventor: Musa Hanhan, San Francisco, CA (US)

(73) Assignee: Genesis Telecommunications Laboratories, Inc., Daly City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 294 days.

(21) Appl. No.: 09/405,335

(22) Filed: Sep. 24, 1999

(65) Prior Publication Data
US 2001/0023448 A1 Sep. 20, 2001

Related U.S. Application Data

(63) Continuation-in-part of application No. 09/151,564, filed on Sep. 11, 1998, now Pat. No. 6,108,711.

(51) Int. Cl.[7] ............................................... G06F 15/16
(52) U.S. Cl. ..................................... 709/218; 709/219
(58) Field of Search ........................ 713/201; 705/52; 709/246, 242, 224, 219, 234, 203, 216, 217, 218; 345/179

(56) References Cited

U.S. PATENT DOCUMENTS

| | | | | |
|---|---|---|---|---|
| 5,623,600 A | * | 4/1997 | Ji et al. ....................... 713/201 |
| 5,627,764 A | * | 5/1997 | Schutzman et al. .......... 709/207 |
| 5,673,322 A | * | 9/1997 | Pepe et al. ..................... 705/52 |
| 5,727,159 A | * | 3/1998 | Kikinis ......................... 709/246 |
| 6,108,711 A | * | 8/2000 | Beck et al. ................... 709/242 |
| 6,115,742 A | * | 9/2000 | Franklin et al. ............. 709/224 |
| 6,119,155 A | * | 9/2000 | Rossmann et al. .......... 709/219 |
| 6,119,167 A | * | 9/2000 | Boyle et al. ................. 709/234 |
| 6,292,181 B1 | * | 9/2001 | Banerjee et al. ............. 345/179 |

FOREIGN PATENT DOCUMENTS

WO     WO 9917518 A     4/1999

OTHER PUBLICATIONS

Bruce Zenel et al., "Intelligent Communication Filtering for Limited Bandwidth Environments", Workshop on Hot Topics in Operating Systems, May 4, 1995, pp. 28–34.

* cited by examiner

Primary Examiner—Le Hien Luu
(74) Attorney, Agent, or Firm—Donald R. Boys; Central Coast Patent Agency, Inc.

(57) ABSTRACT

A proxy system enables a worker remote from a communication center and limited to a light computer device unable to operate as a workstation at the communication center to operate with full access to data and software at the communication center. A proxy server, which may be a LAN-connected server at the communication center, has a two-way data link to the light computer device operated by the remote agent, and executes software which ascertains the hardware and software characteristics of the light device. The proxy server accesses communication center data at direction from the light device, operates communication center software tools, and provides results to the light device over the communication link in a form usable by the light device.

10 Claims, 2 Drawing Sheets

METHOD AND APPARATUS FOR DATA-LINKING A MOBILE KNOWLEDGE WORKER TO HOME COMMUNICATION-CENTER INFRASTRUCTURE

CROSS-REFERENCE TO RELATED DOCUMENTS

The present patent application is related U.S. patent application Ser. No. 09/151,564, now U.S. Pat. No. 6,108,711, filed Sep. 11, 1998 as a Continuation-in part (CIP), and the prior application is incorporated by reference in its entirety.

FIELD OF THE INVENTION

The present invention is in the field of multimedia telephony communication, which includes connection-orientated-switched-telephony (COST) and data-network-telephony (DNT), and pertains more particularly to methods and apparatus for facilitating a home communication-center data-connection capability for a roaming mobile knowledge worker.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regard to client satisfaction. Such computer-enhanced telephony is known in the art as computer-telephony integration (CTI).

There are many ways that CTI enhancement may be done in the art, and the present inventors are knowledgeable in most of these. The present inventors are also knowledgeable about many special architectures and software enhancements that are not in the public domain. In the following background material only that material specifically designated as prior art should be taken to be acknowledged as prior art material by the inventors.

Generally speaking, CTI implementations of various design and purpose are implemented both within individual call-centers and, in some cases, at the telephone network level. For example, processors running CTI software applications may be linked to telephone switches, service control points (SCPs), and network entry points within a public or private telephone network. At the call-center level, CTI processors are typically connected to telephone switches and, in some cases, to similar CTI hardware at the network level, often by a dedicated digital link. CTI processors and other hardware within a call-center is commonly referred to as customer premises equipment (CPE). It is the CTI processor and application software in such centers that provides computer software enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents using such stations may have access to stored data and enhanced services and tools as well as being linked to incoming callers by telephone equipment. Such stations may be, and usually are, interconnected through the PC/VDUs by a local area network (LAN). One or more data or transaction servers may also be connected to the LAN that interconnects agent stations. The LAN is, in turn, typically connected to the CTI processor, which is connected to the call switching apparatus of the call center in systems known to the present inventors.

When a call arrives at a call center, whether or not the call has been pre-processed at a service control point (SCP), typically at least the telephone number of the calling line is made available to the receiving switch at the call center by the network provider. This service is available by most networks as caller-ID information in one of several formats such as Automatic Number Identification (ANI). Typically the number called is also available through a service such as Dialed Number Identification Service (DNIS). If the call center is computer-enhanced (CTI), the phone number of the calling party may be used, in systems known to the present inventors, as a key to access additional information from a customer information system (CIS) database at a server on the network that connects the agent workstations. In this manner information pertinent to a call may be provided to an agent, often as a screen pop on the agent's PC/VDU.

In recent years, advances in computer technology, telephony equipment, and infrastructure have provided many opportunities for improving telephone service in public-switched and private telephone intelligent networks. Similarly, development of a separate information and data network known as the Internet, together with advances in computer hardware and software have led to a new multimedia telephone system known in the art by several names. In this new system telephone calls are simulated by multimedia computer equipment, and data, such as audio data, is transmitted over data networks as data packets. In this system the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional systems are referred to herein as Connection-Oriented Switched-Telephony (COST) systems, CTI enhanced or not.

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT.

Both systems use signals transmitted over network links. In fact, connection to data networks for DNT such as IPNT is typically accomplished over local telephone lines, used to reach points in the network such as an Internet Service Provider (ISP), which then connects the user to the Internet backbone. The definitive difference is that COST telephony may be considered to be connection-oriented telephony. In the COST system, calls are placed and connected by a specific dedicated path, and the connection path is maintained over the time of the call. Bandwidth is basically assured. Other calls and data do not share a connected channel path in a COST system. A DNT system, on the other hand, is not dedicated or connection-oriented. That is, data, including audio data, is prepared, sent, and received as data packets over a data-network. The data packets share network links and available bandwidth, and may travel by varied and variable paths.

Recent improvements to available technologies associated with the transmission and reception of data packets during real-time DNT communication have enabled companies to successfully add DNT, principally IPNT, capabilities to existing CTI call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

In addition to Internet protocol (IPNT) calls, a DNT center may also share other forms of media with customers accessing the system through their computers. E-mails, Video mails, fax, file share, file transfer, video calls, and so forth are some of the other forms of media which may be used. This capability of handling varied media leads to the term multimedia communications center. A multimedia communications center may be a combination CTI and DNT center, or may be a DNT center capable of receiving COST calls and converting them to a digital DNT format. The term communication center will replace the term call center hereinafter in this specification when referring to multimedia capabilities.

In typical communication centers, DNT is accomplished by Internet connection and IPNT calls. For this reason, IPNT and the Internet will be used in examples to follow. It should be understood, however, that this usage is exemplary, and not limiting.

In systems known to the inventors, incoming IPNT calls are processed and routed within an IPNT-capable communication center in much the same way as COST calls are routed in a CTI-enhanced call center, using similar or identical routing rules, waiting queues, and so on, aside from the fact that there are two separate networks involved. Communication centers having both CTI and IPNT capability utilize LAN-connected agent-stations with each station having a telephony-switch-connected headset or phone, and a PC connected, in most cases via LAN, to the network carrying the IPNT calls, or to a network-connected server on the LAN. Therefore, in most cases, IPNT calls are routed to the agent's PC while conventional telephony calls are routed to the agent's conventional telephone or headset. Typically separate lines and equipment are implemented for each type of call weather COST or IPNT.

Due in part to added costs associated with additional equipment, lines, and data ports that are needed to add IPNT capability to a CTI-enhanced call-center, developers are currently experimenting with various forms of integration between the older COST system and the newer IPNT system. For example, by enhancing data servers, interactive voice response units (IVR's), agent-connecting networks, and so on, with the capability of conforming to Internet protocol, call data arriving from either network may be integrated requiring less equipment and lines to facilitate processing, storage, and transfer of data. Some such equipment and services are known to the present inventors, which are not in the public domain.

With many new communication products supporting various media types available to businesses and customers, a communication center must add significant application software to accommodate the diversity. For example, e-mail programs typically have differing parameters than do IP applications. IP applications are different regarding protocol than COST calls, and so on. Separate routing systems and/or software components are needed for routing e-mails, IP calls, COST calls, file sharing, etc. Agents must then be trained in the use of a variety of applications supporting the different types of media.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

In a system known to the inventor, full multimedia functionality is supported wherein agents and customers may interact in a seamless manner. Likewise interaction histories of virtually any supported media may be automatically recorded and stored for latter access by agents and in some cases customers (clients) themselves. Such a system, termed a customer-interaction-network-operating system (CINOS) by the inventor, comprises a suite of software enhancements, implemented both at the communication center and at CPE sites, that are designed to provide automated and seamless interaction between customers, associates, and agents.

In order to successfully implement and administer the many aspects of a network operating system such as the CINOS system introduced above, a new agent called a knowledge worker has emerged. This is especially true in more state-of-the-art multimedia communication-centers. In a broad sense, a knowledge worker may be any individual that specializes, or is expert in a specific field or fields utilized within the communication center. Knowledge workers may be responsible for such tasks as creating automated scripts, building integrated software applications, tracking and parsing certain history paths in a database for automated reporting, and other relatively complicated functions. Knowledge workers may also be trained agents responsible for sales, service and technical assistance.

A knowledge worker, weather an agent or specialized technician, generally has all of the resource in the way of customer data, interaction data, product data, and multimedia support at his fingertips as long as he or she is operating from a designated PC/VDU or other supported station within the communication center. In some cases, a knowledge worker may have full data access and multimedia support if he is located off-site but is linked to the center by a suitable data-network connection such as from a home office or remote station.

Because a network operating system such as CINOS requires that certain customer or client CPE, including network equipment, be enhanced with software designed to facilitate seamless interaction with the communication center, it is often necessary that knowledge workers be dispatched into the field away from the communication center to aid in such as installation, set-up, and programming of software applications and tools. In some instances this can be a formidable enterprise.

A knowledge worker possesses the kind of skills that are largely indispensable and not shared by the average communication center worker. When a knowledge worker is away from a home-center such as on the road, or at a client location, he is generally limited in data access and interaction capability with his or her home communication-center data and tools. In some cases this may be a liability to the center. In many cases she/he will be limited to specific data that was carried along, or that may be downloaded from the center to such as a cellular telephone, a personal digital assistant (PDA) or a Laptop computer. Moreover, a mobile knowledge worker in the field may also be limited in providing service to the home-center by virtue of the same data-access limitations.

In some cases, a knowledge worker at a client site may, after some set-up, programming, and initialization, commandeer a suitable client PC so that she/he may establish free and unfettered access to home-center data and software services. However, such interaction, if not on the be-half of the client, may be deemed by the client as an intrusion at most and an inconvenience at least.

What is clearly needed is a method and apparatus enabling full and unfettered access to home-center data and services for a mobile knowledge worker associated with the home center. Such a method and apparatus would allow a communication center to freely dispatch mobile knowledge workers to such as client locations or other areas within an exceptionally large communication campus or network of communication centers without feeling vulnerable to a loss of technical services. Moreover, such access would not have to rely on client associated resources.

SUMMARY OF THE INVENTION

In a preferred embodiment of the present invention, in a communication center having agent work stations, server-based software tools, and server-based data storage, a system for enabling a remote agent, using a light computerized device having insufficient power to operate as a workstation of the communication center, to access and operate as an agent with full access to data and software tools of the communication center is provided, the system comprising a proxy server executing a software suite; a first two-way data link, between the proxy server and one of a server or a workstation at the communication center; and a second two-way data link between the proxy server and the light device used by the remote agent. The system is characterized in that the proxy server, by the software suite, upon establishing a connection over the second data link, ascertains hardware and software characteristics of the light device, establishes a connection to a server or a workstation at the communication center over the first two-way data link at direction of the light device, accesses data and operates software at the communication center on behalf of and according to direction from the light device, transforms the data and results of the software operations into a form useable by the light device, and transmits the transformed information to the light device via the second two-way data link.

In some embodiments the light device is one of a hand-held computer, a personal digital assistant, a portable laptop computer, and a cell telephone. The proxy server may be a LAN-connected server in the communication center, the first two-way data link being the communication center LAN. Further, the second two-way data link may be one of a dial-up telephone connection, a wireless connection, or a data-packet connection via the Internet.

In preferred embodiments the proxy server and the light computer device each execute an instance of a Nano-browser enabling Internet Protocol communication over the second data link. In other aspects of the invention methods for practicing the invention using the apparatus of the invention are taught. In the various embodiments of the invention, taught in enabling detail below, a remote knowledge worker or agent trained to operate in and with a communication center, is enabled to operate with full access to data and application software while using a light computer device itself unable to operate directly as a workstation in the communication center.

BRIEF DESCRIPTION OF THE DRAWING FIGURES

DESCRIPTION OF THE PREFERRED EMBODIMENTS

Figure 1:
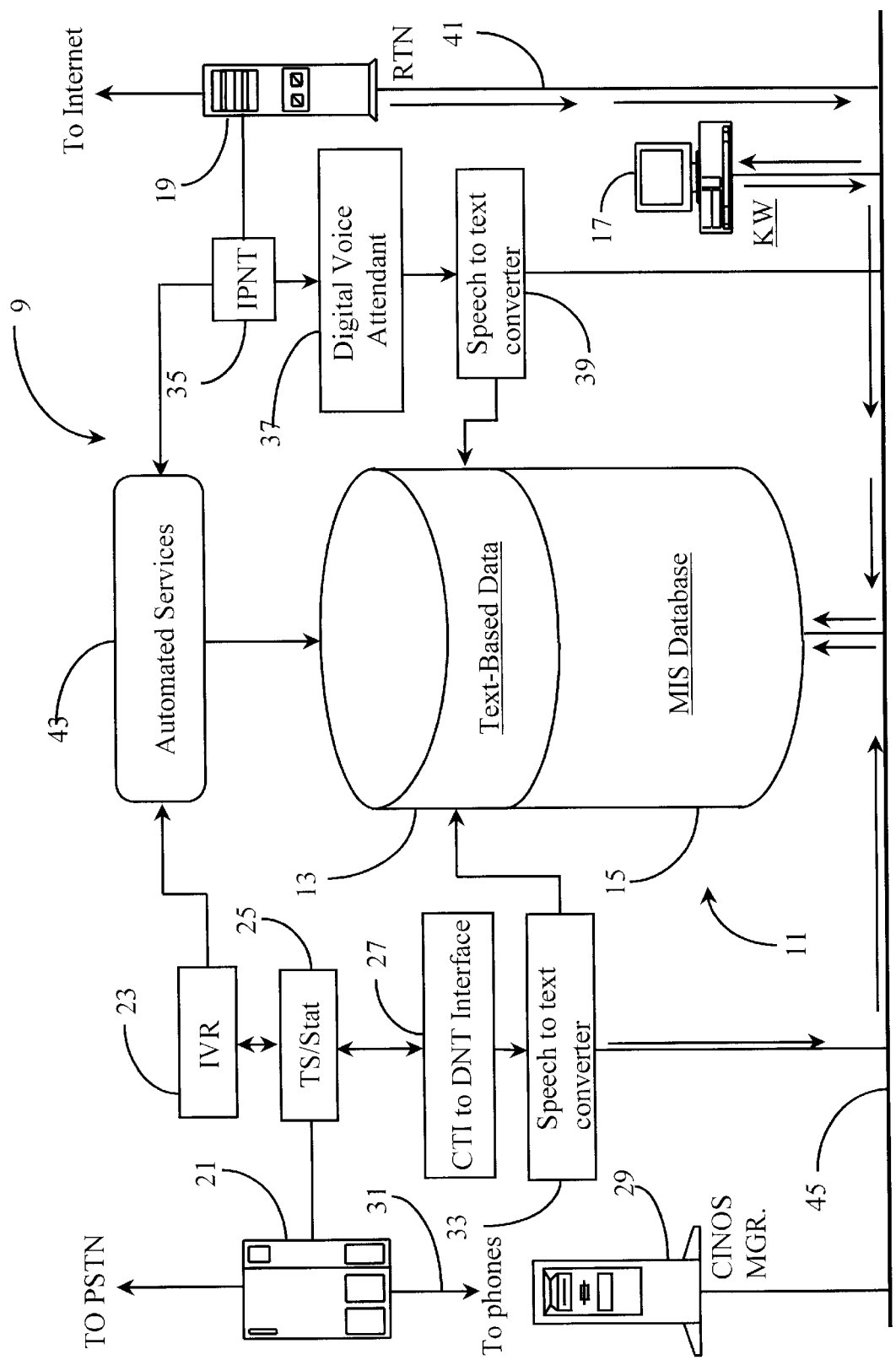
FIG. 1 is an exemplary overview of a multimedia-interaction storage system within a communication center according to an embodiment of the present invention.

FIG. 1 is an exemplary overview of a multimedia-interaction storage system within communication-center architecture 9 according to an embodiment of the present invention. Communication center 9 is illustrated solely for the purpose of illustrating just one of many possible system architectures in which the invention may be practiced. Center 9, which in a preferred embodiment comprises both conventional and data-network telephony (DNT) apparatus, is exemplary of an architecture that could facilitate a network operating system such as CINOS (known to the inventor). Communication center 9 may be assumed to have all the internal components described in the background section such as agent workstations with LAN connected PC/VDUs, agent's COST telephones, and so on. Such a communication center operating an enhanced interaction network operating system such as CINOS would employ knowledge workers trained to interact with associates, clients, and in some cases internal systems that require programming, scripting, researching, and the like.

For the purposes of this specification, a knowledge worker (KW) is a highly-skilled individual that is at least trained in systems programming and implementation using software tools. A KW is also typically trained in the use of all supported communication media and applications that may be used with a network operating system. In many instances, a KW may also handle high level sales and service while functioning as an agent for the communication center both inside the center and at a client's location. However, as described in the background section, a KW away from home (in the field) will not generally have full access to all communication center data and tools unless he/she carries a powerful computer station along, or commandeers a client's station having suitable connectivity and ability to perform all of the applications at the home station. Therefore, having many such highly skilled workers in the field and not in the communication center may be, at times, a considerable liability to the communication center, but unavoidable at times. It is to this aspect that the present invention mostly pertains.

Referring again to FIG. 1, a multimedia data-storage system represented herein by a centralized grouping of connected and labeled text blocks is provided and adapted to facilitate rules-based storage of all communication-center interaction between agents and clients including co-workers and associates. Such a representation illustrates an important part of CINOS function.

At the heart of the storage system is a mass-storage repository 11 adapted to store multimedia interactions as well as text-based related files. Repository 11 may utilize any form of digital storage technology known in the art such as Raid-Array, Optical Storage, and so on. The storage capacity of repository 11 will depend directly on it's implementation with regard to the size of communication center 9 and predicted amount of data that will be stored and kept by the system.

In this example, repository 11 is divided logically into two sections. One section, multimedia information system (MIS) 15, is responsible for storing copies and records of all multimedia interactions, defined as media that is not text-based, such as audio, video, and graphics-based media. All multimedia interactions are stored in MIS 15 whether incoming, outgoing, or internal. A second section, herein referred to as text section 13 is responsible for all text-based interactions as well as text versions and annotations related to non-text files.

Repository 11 is connected to a communication-center local area network (LAN) 45. Repository 11 is accessible via LAN 45 to authorized personnel within a communication center such as agents, KWs, or the like using computerized workstations connected on the LAN, and may, in some instances, also be made available, in full or in part, to clients and associates communicating with the call center. A network router (RTN) 19 is shown connected to LAN 45 via network connection 41. In this example, network router 19 is the first point within a communication center wherein data network telephony (DNT) media arrives. Network router 19 is exemplary of many types of routers that may be used to route data over LAN 45. An Internet-protocol-network-telephony (IPNT) switch 35 is connected to network router 19 via a data link. IPNT switch 35 further routes or distributes live IPNT calls that do not require routing to a live agent. IPNT calls that are routed to live agents are sent over connection 41 to LAN 45 where they reach agent PC/VDU's at agent and KW workstations connected to the LAN (PC/VDU is exemplary) or DNT-capable phones (not shown) as illustrated via directional arrows.

In the multimedia storage system represented herein, a KW such as one operating at a provided work station (PC/VDU 17) typically has access to all multimedia interaction histories that are stored in repository 11. CINOS applications (not shown) executable on workstations such as PC/VDU 17 empower the KW to facilitate many tasks in the realm of communication center functionality. Such tasks include, but are not limited to, researching and creating virtually any type of system report regarding data held in repository 11, updating and creating new management applications that may alter or enhance CINOS functionality, and other such system-administrator-type duties. LAN 45 is the network through which the "in-house" KW is empowered to access such as a CINOS MGR server 29, repository 11, and other connected data sources and systems (not shown) that may be present in a communication center such as center 9.

By reviewing capabilities of the multimedia storage system of communication center 9, a full appreciation of the necessity of various in-house skills possessed by a KW, such as the skill of operating at station 17, may be acquired by one with skill in the art. Therefore, a detailed review of communication-center operation, particularly storing interactions follows.

Creating text-based versions of non-text multimedia transactions may, in some cases, be accomplished by an automated method. For example, a digital voice attendant 37 is provided and linked to IPNT switch 35. Digital voice attendant 37 may be of the form of a DNT-capable IVR or other digital voice-response mechanism as may be known in the art. Such automated attendants may interact with a voice caller instead of requiring a live agent. A speech-to-text converter 39 is provided and linked to voice attendant 37. As digital voice attendant 37 interacts with a caller, speech-to-text converter 39 converts the speech to text. Such text may then be stored automatically into text section 13 of repository 11 and related to the also-recorded audio data. Part of the purpose and rationale for the creation of text documents related to non-text files is that text can be more easily mined for content and meaning than non-text files.

It will be apparent to one with skill in the art that as speech recognition technologies are further improved over their current state, which is adequate for many implementations, reliable text versions of audio transactions are not only possible but practical. Such speech-to-text conversions are used here only for the convenience of automation wherein no live attendant is needed to transcribe such audio data. The inventor is familiar with such converters as used in such as the CINOS system incorporated herein by reference. Such converters provide convenience in transaction recording but are not specifically required to achieve the interaction storage objectives of communication center 9. A KW such as one operating from station 17 may be called upon to create and set-up the various rules-based applications that are required for routing and determining when digital voice attendant 37 will interface with a client or associate.

An automated services system 43 is provided and has a direct connection to section 13 of data repository 11. System 43 is adapted to handle automated interaction and response for certain text-based interactions such as e-mails, facsimiles, and the like, wherein a complete text record of the interaction may be mirrored, or otherwise created and stored into text section 13. For example, a fax may be sent and mirrored into section 13 or, perhaps recreated using an optical character recognition (OCR) technique and then entered. Physical text-documents such as legal papers and the like may be automatically scanned, processed by OCR techniques, and then entered into text section 13 before they are sent to clients. There are many possible automated techniques for creating and entering text files into a database including methods for generating automated responses. A KW such as one operating at station 17 may be called upon to oversee the creation and operation of all automated services insuring such as prompt response time, queue management, accurate threading and organization into a database, updating or adding enhanced capability, and so on.

With respect to the dual telephony capability (COST/DNT) of communication center 9, a central telephony switch 21 is provided to be a first destination for COST calls arriving from, for example, a PSTN network. Switch 21 may be a PBX, ACD, or another known type of telephony switch. Internal COST-wiring 31 connects telephony switch 21 to agent's individual telephones (not shown). Switch 21 is enhanced by a computer-telephony integration (CTI) processor 25 running an instance of a T-server CTI suite and an instance of a Stat-server, which are software enhancements known to the inventor. Such enhancements provide CTI applications, such as intelligent routing, statistical analysis routines, and so on. CINOS as previously described and disclosed in the copending prior application incorporated herein is adapted to be integrated with such software when present in a CINOS-enhanced communication-center. A KW such as one operating station 17 may be called upon to compile and analyze results provided from statistical analysis routines executed at processor 25 for the purpose of creating new routing rules of routines that further enhance functionality.

An intelligent peripheral in the form of a COST IVR 23 is provided for the purpose of interacting with callers seeking information and the like who do not require connection to a live agent at the communication center. IVR technology may comprise voice response, touch tone interaction, or a combination of such known technologies. IVR 23 is linked to processor 25 and also to automated services 43. An example of an IVR interaction may take the form of a presentation to a caller from the PSTN of options for using an automated service such as those described above, or perhaps waiting for a live agent. A KW such as a KW operating at station 17 may be called upon to create and install appropriate interaction scripts into IVR 23 for interaction with clients and associates calling in from the PSTN.

A CTI to DNT interface 27 is provided for the purpose of converting COST data to digital mode compatible with DNT so as to be adapted for digital storage and interaction according to CINOS functionality and enterprise business rules. Bi-directional arrows illustrated between interface 27 and IVR 23 represent the ability to route interactions in either direction. COST to DNT conversion may be accomplished in IVR 23 in addition to or in place of interface 27. The connection architecture presented herein is exemplary only.

A speech-to-text converter 33 is provided for converting audio from the CTI side to text for entering into text section 13 as was taught with regard to converter 39 on the DNT side. Actual recorded media interactions are illustrated entering MIS 15 after text versions are rendered and entered into section 13, however, this is not required. In some instances text versions of multimedia interactions may be rendered after the interaction is stored. There is no limitation regarding sequence. It is sufficient to say that converters 39 and 33 are capable of real-time conversion and entry.

Server 29 shown connected to LAN 45 is adapted to host a CINOS MGR (operating system) application which provides control and organization with regard to various functions provided by the CINOS system as a whole. The storage architecture represented herein by the described text blocks, and all it encompasses in this embodiment, is meant only to be an example architecture as may be dedicated to the storage and organization of communication-center data according to enterprise rules.

It will be appreciated by one with skill in the art that a network operating system including a system for automatically storing and recording virtually all communication center transactions requires substantial skill in set-up, implementation, and administration both on the COST side and the DNT side within a communication center such as center 9. Moreover, a substantial network operating system such as CINOS has client-side software applications that subscribers or associates must utilize in order to achieve full seamless interaction with agents and subsystems operating according to the system parameters. In some cases, the operating system may span several communication centers over a large technical campus connected by a WAN. This fact requires that system administrators and troubleshooters be available to assist in facilitating and preparing client and associate CPE for interacting with communication center equipment and software according to system parameters.

If a KW such as one operating at station 17 could be mobilized to operate effectively outside of communication center 9 such as at a client location, and still be able to service center 9 from the field, then an enterprise hosting center 9 and perhaps other like centers could save considerable resources associated with training and expenses incurred for maintaining a larger number of fixed KW's.

The inventor provides a method and apparatus whereby such a mobile KW could have full and unfettered access to virtually all data systems and sources housed within his home communication center without having to carry a powerful station or inconveniencing a client by commandeering client resources. This inventive method and apparatus is described below in enabling detail.

Figure 2:
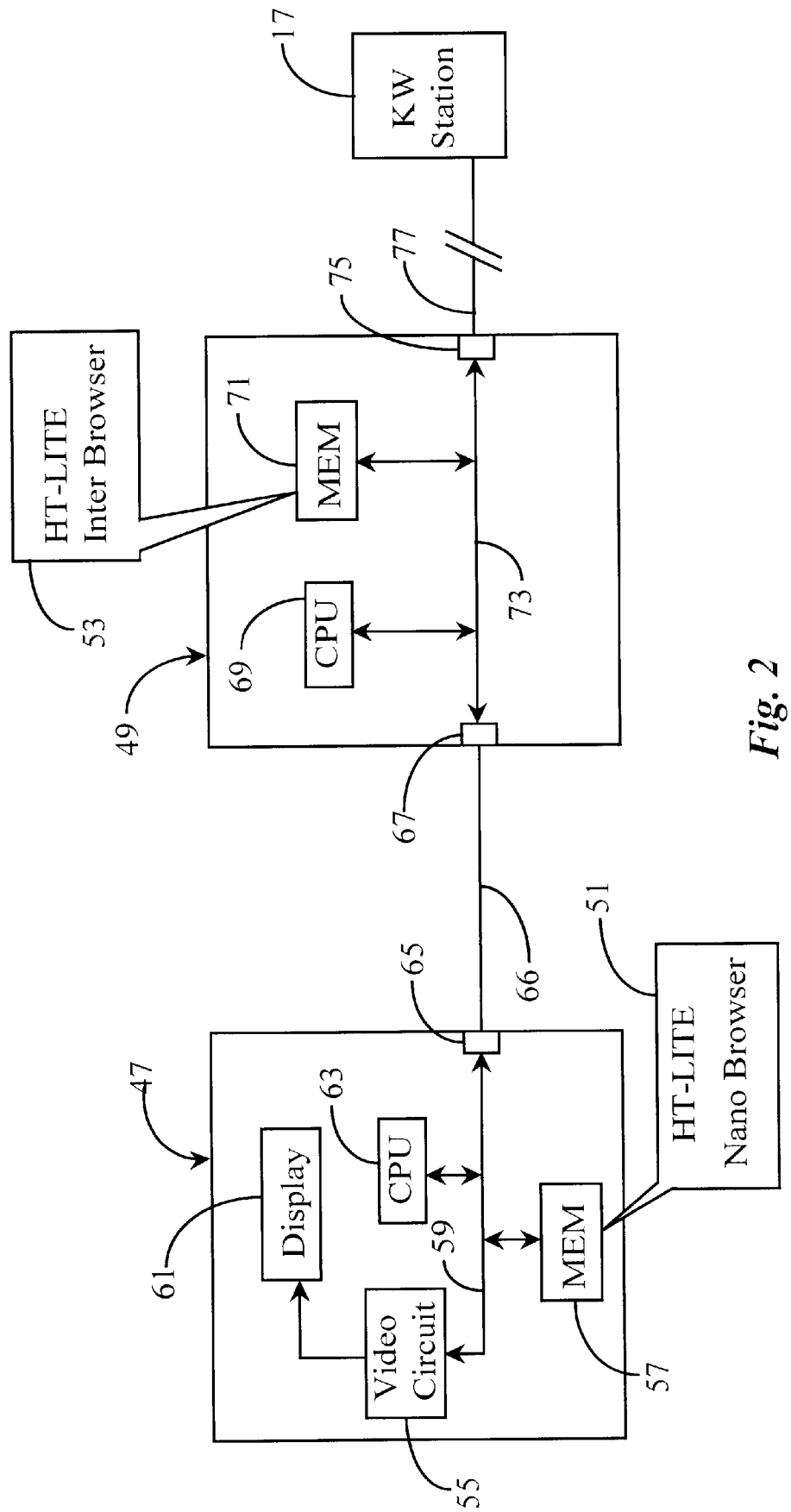
FIG. 2 is a block diagram illustrating a connective relationship between a proxy server and a hand-held computer operated by a mobile knowledge worker according to a preferred embodiment of the present invention.

FIG. 2 is a block diagram illustrating a connective relationship between a proxy server 49 and a hand-held computer 47 operated by a mobile KW according to a preferred embodiment of the present invention.

Hand-held computer 47 has a CPU 63, a memory 57, a video adapter circuitry 55, and a modem 65 all communicating on bus 59. Video circuitry 55 drives a display 61. Memory 57 may be any of a number of types, such as flash, random access (RAM), read-only (ROM) or similar type, or a combination of these. There may be other components as well, but these are not shown to facilitate description of the unique aspects of this embodiment of the invention. The hardware arrangement is intentionally shown as general, and is meant to represent a broad variety of architectures, which depend on the particular computing device used. Possibilities include many types of portable hand-held computers and also adapted cellular phones capable of receiving and sending video. A mobile KW would use such as device for communication and data access while in the field.

Proxy-Server 49 is a relatively sophisticated and powerful computer typical of computers used as WEB servers, although the use in this embodiment of Proxy-Server 49 is not the conventional or typical functions of a WEB server as known in the art. Proxy-Server 49 has a CPU 69, a memory 71, and a means of connecting to a data network such as the Internet. The network connecting means in this embodiment is a modem 67 communicating on a bus 73. In other embodiments the network connecting means may be a network adapter or other.

Modem 67 in the embodiment shown is compatible with modem 65 in computer 47. A communication link 66, which may be facilitated by a telephone line or a wireless connection, facilitates communication between computer 47 and server 49. The means of connection and communication can be any one of several sorts, such as a telephone dial-up, an Internet connection through an ISP, or a cell telephone connection, wireless IP networks or other wireless link, including private cell or wireless WAN or LAN. A communication port 75 connects to communication link 77 providing communication, in this case, through the Internet, to a suitable station or server in communication center 9 of FIG. 1. In this example, the linked station is preferably the KW's own home-center workstation or PC/VDU 17 from FIG. 1.

Port 75 and link 77 may also be any one of several types, or a combination of types. In some embodiments, server 49 and station 17 will be nodes on a local area network (LAN) covering a large technical campus, and the link between the two servers will be a serial network link with port 75 being a LAN card according to any of a number of well-known protocols. In other embodiments link 77 may be a telephone line, and port 75 will be a dialup telephone modem. In still other embodiments, this link could be a parallel communication link. This link could also be through the Internet or other wide area network.

Proxy-Server 49 exists in this embodiment of the invention to perform functions enabling hand-held computer 47 to operate as an apparently powerful web-browsing machine, even though the stand-alone capability of computer 47 will not even begin to support such functionality. As is well-known in the art, for a computer to be a fully-functional web-browsing system requires a high-performance CPU and execution of relatively sophisticated web-browsing and display applications. Such a computer typically has to operate, as described above, at or above a million instructions per second.

Proxy-Server 49 executes a program 53 the inventor terms an Inter-Browser. The Inter-Browser combines functionality of a conventional web browser with special functions for recognition of and communication with hand-held computer 47. Commands from computer 47, such as, for example, a command to access a WEB page on the World Wide Web, or a server or station such as station 17 within a home communication center such as center 9, are received by Proxy-Server 49 operating the Inter-Browser program, and acted upon as though they are commands received from a conventional input device such as a keyboard.

Following the example of a command communicated over link 66 from computer 47 for accessing station 17, shown herein and in FIG. 1, Proxy-Server 49 accesses the appropriate server (in this case station 17) over link 77, and transmits the appropriate data over link 77. Proxy-Server 49 therefore has HTML and TCP/IP capability for accessing source data over the Internet. By hosting other routines that allow interface with data systems, data sources and such as station 17, a KW may have full access to virtually any type of data or software tools that he could access from his station if he were operating from within center 9.

Proxy-Server 49, instead of displaying the downloaded data (or playing video and/or audio output, as the case may be, depending on the downloaded data), translates the data to a simpler communication protocol and sends the data in a TCP/IP protocol to computer 47 for output over link 66. Link 66 becomes a dedicated TCP/IP pipe to and from Proxy-Server 49. Proxy-Server 49 thus acts as a proxy for computer 47, performing those functions of WEB browsing and data download that computer 47 cannot perform under its own computing power.

Computer 47, through execution of a program the inventor terms a NanoBrowser 51 sends commands entered at computer 47 over link 66 to Proxy-Server 49 and accepts data from Proxy-Server 49 to be displayed on display 61. Data is transferred in a protocol the inventor terms HT-Lite. The NanoBrowser also provides for interactive selection of links and entry into fields in displays, as is typical for WEB pages displayed on a computer screen. The NanoBrowser provides for accepting such entry, packaging data packets in TCP/IP form, and forwarding such data to Proxy-Server 49, where much greater computer power provides for efficient processing.

One of the processing tasks that has to conventionally occur at the browser's computer is processing of received data into a format to be displayed on whatever display the user has. There are, as is well-known in the art, many types of displays and many display modes. These range all the way from relatively crude LCD displays to high-resolution, multi-color displays. There are, in addition, a number of other functions that have to be performed conventionally at a user's computer to interact effectively with the WWW. For example, audio and video and some other functions typically require supplemental, or helper, applications to be installed on or downloaded to a field unit to process audio and video data and the like.

Most data transferred by WEB servers assumes relatively high-end displays, such as color SVGA displays as known in the art. Data accessed through the Internet from such as MIS database 15 of FIG. 1 would also assume a high-end display and large file size dependent on the type of media accessed. In PDAs, cellular video phones, and digital organizers, such as those anticipated for use in the present invention, the displays are relatively low resolution, and are typically LCD in nature. In the system described with the aid of FIGS. 1 and 2, Inter-Browser program 53 at Proxy-Server 49 and the HT-Lite Nano-Browser 51 at hand-held unit 47 cooperate in another manner as well. When one connects to the Proxy-Server the hand-held unit, through the HT-Lite Nano-Browser program, provides a signature which the Proxy-Server compares with logged signatures.

An ID match when connecting a hand-held unit to the Proxy-Server provides the Proxy-Server with information about the hand-held unit, such as CPU type and power, screen size, type and resolution, presence of a pointer device, and sound capability. The Proxy-Server then uses this specific information to translate HTML and other files from the Internet to a form readily usable without extensive additional processing by the hand-held unit. For a small monochrome LCD display a 60 k/70 k JPEG file becomes a 2 k/4 k bit map, for example. Also, multi-file pages are recombined into single file pages. This translation also minimizes bandwidth requirement for link 66, and speeds transmission of data. In this way, a mobile KW may have access to all types of data sourced at his or her home communication center. Through proxy server 49, a KW may also initiate and receive multimedia interactions including high-end transactions while operating unit 47.

It is in this ability of the Proxy-Server to do the heavy computing, of which the translation of HTML files is a single example, that is responsible for a unique ability of hand-held devices in practicing embodiments of the present invention to accomplish functions that they could not otherwise accomplish, and to do so without inordinate usage of stored energy. In various embodiments of the present invention, hand-held devices with CPUs having an ability to run at from 0.001 to 0.05 MIPs can serve as WEB browsers, displaying WEB pages and allowing users to initiate on-screen links and to input data into input fields. Given the above example of MIPs requirement for WEB browsing, where currently available solutions may provide a 5× advantage, practicing the present invention can provide an advantage of up to 2000×, resulting in battery life approaching 2 weeks (given a 100 g battery weight), where expected battery life for similar functionality with a powerful CPU was calculated as 8 minutes.

As a given example of an instance wherein a mobile KW may provide full service to a home center, consider the following: Assume a mobile KW from center 9 of FIG. 1 is at a client premise installing network software and therefore not at center 9. He opens his or her hand-held device 47 and plugs in to a nearby telephone jack for the purpose of establishing a connection to proxy server 49, which in this case, may be implemented anywhere on the Internet. While he is configuring software on a client's computer, an important call from communication center 9 arrives through server 49 (hosted by the enterprise) to his hand-held 47. The call is pre-processed at proxy server 49 by Inter-Browser 53 and transmitted over link 66 to device 47 where it is displayed according to device parameters and rules associated with Nanno-Browser 51.

Suppose that the call requests that the KW rewrite a script used in such as digital voice attendant 37 because the current message has become corrupted or is not playing properly. The KW may then initiate a multimedia call to his resident work station such as station 17 (FIG. 1) through proxy 49 by way of link 77. The call would arrive at router 19 and be routed directly over link 41 to station 17 based on identity thus by-passing normal DNT call handling routines. Part of the call includes a command to allow the KW to control the operation of station 17 by proxy. He may then use command keys to cause Inter-Browser 53 to browse a list of pre-prepared DNT scripts stored at station 17. Such a list may appear as a text summary on such as display 61 of device 47. The KW may then scroll through and select a script thus issuing a command to station 17 (by proxy) to access attendant 37 (FIG. 1) and replace the message which is overwritten by the new one.

It will be apparent to one with skill in the art that there are a wide variety of interaction possibilities by virtue of the method and apparatus of the present invention. In the cited example, a DNT call was made to the KW's computing device 47. Therefore, proxy 49 acts in one aspect as a call router. In another embodiment, a KW may accept a cellular call or a COST call and respond to the request using device 47.

In still another embodiment, a KW operating a portable device such as device 47 may temporarily plug in to any connected LAN network such as may be found connecting a large technical campus or the like. Upon plugging in, the KW may initiate an outbound-call to server 49 in the Internet and receive a temporary IP address and device authentication for communicating with such as center 9.

To practice the invention, given an accessible WEB server configured as a Proxy-Server according to an embodiment of the present invention, one needs only to load HT-Lite NanoBrowser software on a computer and to provide Internet access for the computer, such as by a telephone modem. In many cases, candidate computers have built-in modems. In other cases, an external modem may be provided and connected. In the case of hand-held devices, such as PDAs and organizers, some have an ability to load software via a serial port, a PC card slot, through the modem extant or provided, or by other conventional means. In some cases, all operating code is embedded, that is, recorded in read-only memory. In some of these cases, adding HT-Lite routines may require a hardware replacement. In virtually all cases of hand-held devices, however, the necessary routines can be provided.

One of the components of the HT-Lite Nano-Browser software (51) is a minimum browser routine termed by the inventor a Nano-Browser. The Nano-Browser is capable of exerting a URL over the modem connection to access the Proxy-Server. Theoretically, one could exert a URL of a WEB site other than the Proxy-Server, but the result would be an unusable connection, as the small hand-held unit would not be able to handle the sophisticated data provided to be downloaded unless it were such as e-mail or other simple data.

Connection to the Proxy-Server provides the Proxy-Server with information as to the KW and the KW's equipment. These operations proceed in a manner well-known in the art for such log-on and security transactions. Once access is extended to the KW, an interface is provided for the KW to browse in a manner very similar to well-known WEB interfaces. That is, the KW's display (61) provides an entry field for a URL which is asserted by an enter key or the like. There may also be an address book for often-visited sites, as is common with more powerful machines.

Similarly, there are no strict requirements for the location of Proxy-Server 49 or of accessible data sources or home stations in embodiments of the present invention. No restrictions are placed on such locations beyond restrictions on servers/nodes in general. In one embodiment, a corporation with multiple and perhaps international locations may have a local area network with one or more Proxy-Servers, and employees, particularly those employees whose job functions require travel, are provided with hand-held digital assistants according to an embodiment of the present invention. Multiple functions are then provided over Internet connection in Internet protocol, far beyond what could otherwise be provided with small and inexpensive units; and battery life for these units (device 47) would be far beyond what would otherwise be expected. Furthermore, a company could reduce or streamline a force of KW's to a smaller number of mobile KW's with enhanced portable devices such as device 47.

It will be apparent to one with skill in the art that the device-proxy method such as the one described above could be applied to a wide range of communication center architectures and network operating systems without departing from the spirit and scope of the present invention. A KW operating a device such as device 47 may operate while traveling to or from client locations as well as on-site at a client location. Types of devices used to communicate with proxy server 49 may vary without departing from the spirit and scope of the present invention. For example, PDAs, small notebook computers, some cellular telephones, CE type machines, all may be adapted for a proxy relationship.

The method and apparatus of the present invention should be afforded the broadest scope in view of the many possible applications, many of which have been detailed above. The spirit and scope of the present invention is limited only by the claims that follow.

What is claimed is:

1. In a communication center having agent workstations, a system for enabling a remote agent, using a light computerized device having insufficient power to operate as a workstation of the communication center, to access and operate as an agent with full access to data and software tools of the communication center, the system comprising:

a proxy server executing a software suite;

a workstation at the communication center;

a local area network (LAN) connecting the proxy server, the workstation and the data and software tools of the communication center; and a two-way data link between the proxy server and the light computerized device used by the remote agent;

characterized in that the proxy server, by the software suite, upon establishing a connection over the second data link, ascertains hardware and software characteristics of the light computerized device, establishes a connection to a workstation at the communication center over the LAN at direction of the light computerized device, whereby the light computerized device has full access to all data systems and is capable of operating all software available at the communication center from the workstation, via the LAN, on behalf of and according to direction from the light computerized device, transforms the data and results of the software operations into a form useable by the light computerized device, and transmits the transformed information to the light computerized device via the two-way data link.

2. The system of claim 1 wherein the light computerized device is one of a hand-held computer, a personal digital assistant, a portable laptop computer, and a cell telephone.

3. The system of claim 1 wherein the two-way data link is one of a dial-up telephone connection, a wireless connection, or a data-packet connection via the Internet.

4. The system of claim 1 wherein the proxy server and the light computerized device each execute an instance of a Nano-browser enabling Internet Protocol communication over the second data link.

5. The system of claim 1 wherein the LAN has access to an outside wide area network (WAN), via the proxy server, connecting a plurality of remote proxy servers, each at a separate remote call center, and the lite computer device connects to and operates software and accesses data of at least one of the plurality of remote call centers via a workstation at one of the plurality of call centers.

6. In a communication center having agent workstations, a method for enabling a remote agent, using a light computerized device having insufficient power to operate as a workstation of the communication center, to access and operate as an agent with full access to data and software tools of the communication center, the method comprising the steps of:

(a) establishing a connection between the light computerized device and a proxy server over a two-way data link;

(b) ascertaining hardware and software characteristics of the light computerized device over the established connection on the data link;

(c) establishing a local area network (LAN) connection between the proxy server and the workstation at the communication center at direction of the light computerized device;

(d) accessing, from the workstation, all data systems and software available at the communication center on the LAN, on behalf of and according to direction from the light computerized device;

(e) transforming the data and results of the software operations into a form useable by the light computerized device, and transforming the data and commands from the light computerized device to a form useable by the software operations; and (f) transmitting the transformed information to the light computerized device from the software operations at the communication center and to the software operations from the light computerized device via the two-way data link.

7. The method of claim 6 wherein the light computerized device is one of a hand-held computer, a personal digital assistant, a portable laptop computer, and a cell telephone.

8. The method of claim 6 wherein the two-way data link is one of a dial-up telephone connection, a wireless connection, or a data-packet connection via the Internet.

9. The method of claim 8 wherein the LAN has access to an outside wide area network (WAN) connecting a plurality of remote proxy servers, each at a separate call center, via the proxy server, and the lite computer device connects to and operates software and accesses data of at least one of the remote call centers via a workstation at, at least one of the plurality of call centers.

10. The method of claim 6 wherein the proxy server and the light computerized device each execute an instance of a Nano-browser enabling Internet Protocol communication over the second data link.

* * * * *